United States Patent
Wang et al.

(10) Patent No.: US 12,443,799 B2
(45) Date of Patent: Oct. 14, 2025

(54) DISPLAY METHOD, METHOD OF TRAINING SEMANTIC UNIT DETECTION MODEL, ELECTRONIC DEVICE, AND STORAGE MEDIUM

(71) Applicant: Beijing Baidu Netcom Science Technology Co., Ltd., Beijing (CN)

(72) Inventors: Haifeng Wang, Beijing (CN); Zhongjun He, Beijing (CN); Hua Wu, Beijing (CN); Zhanyi Liu, Beijing (CN); Zhi Li, Beijing (CN); Xing Wan, Beijing (CN); Jingxuan Zhao, Beijing (CN); Ruiqing Zhang, Beijing (CN); Chuanqiang Zhang, Beijing (CN); Fengtao Huang, Beijing (CN); Shuangshuang Cui, Beijing (CN); Yongzheng Xin, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 386 days.

(21) Appl. No.: 17/820,768

(22) Filed: Aug. 18, 2022

(65) Prior Publication Data
US 2022/0391594 A1    Dec. 8, 2022

(30) Foreign Application Priority Data

Aug. 18, 2021   (CN) .......................... 202110951982.2

(51) Int. Cl.
*G06F 17/20* (2006.01)
*G06F 40/166* (2020.01)
(Continued)

(52) U.S. Cl.
CPC ............ *G06F 40/30* (2020.01); *G06F 40/166* (2020.01); *G06F 40/279* (2020.01); *G06F 40/58* (2020.01); *G06N 5/022* (2013.01); *H04N 5/278* (2013.01)

(58) Field of Classification Search
CPC ...... G06F 40/166; G06F 40/279; G06F 40/58; G06F 40/30; G06F 16/35
(Continued)

(56) References Cited

U.S. PATENT DOCUMENTS

2016/0092438 A1    3/2016   Sonoo

FOREIGN PATENT DOCUMENTS

| CN | 109582982 |   | 4/2019 |   |
|---|---|---|---|---|
| CN | 110717017 A | * | 1/2020 | ......... G06F 16/3344 |

(Continued)

OTHER PUBLICATIONS

Akiko Nakabayashi, et al., Split position of translation segment in simultaneous machine translation, Proceedings of the Twenty-fifth Annual Meeting of the Association for Natural Language Processing [online], Japan, The Association for Natural Language Processing, Mar. 4, 2019, pp. 950-953; with English translation.

(Continued)

*Primary Examiner* — Md S Elahee
(74) *Attorney, Agent, or Firm* — HSML P.C.

(57) ABSTRACT

A display method, a method of training a semantic unit detection model, an electronic device, and a storage medium, which relate to a field of artificial intelligence technology, in particular to fields of natural language processing and machine translation technologies. The display method includes: acquiring a language sequence to be displayed; dividing the language sequence to be displayed
(Continued)

into a plurality of semantic units with semantics; and converting the plurality of semantic units into subtitles for display one by one.

15 Claims, 5 Drawing Sheets

(51) Int. Cl.
  *G06F 40/279* (2020.01)
  *G06F 40/30* (2020.01)
  *G06F 40/58* (2020.01)
  *G06N 5/022* (2023.01)
  *H04N 5/278* (2006.01)

(58) Field of Classification Search
  USPC .............................................................. 704/3
  See application file for complete search history.

(56) References Cited

FOREIGN PATENT DOCUMENTS

| | | | | |
|---|---|---|---|---|
| CN | 111310481 | | 6/2020 | |
| CN | 112633017 | | 4/2021 | |
| CN | 113343675 A | * | 9/2021 | |
| CN | 113343720 A | * | 9/2021 | ........... G06F 40/258 |
| JP | 2016-071761 | | 5/2016 | |

OTHER PUBLICATIONS

Koichiro Kasa et al., Detection of Simultaneous Translation Units Using a Parallel Translation Corpus, Proceedings of the Fifteenth Annual Meeting of The Association for Natural Language Processing, Japan, The Association for Natural Language Processing, Mar. 2, 2009, pp. 881-884; with English translation.

Office Action issued for Japanese Patent Application No. 2022-111826, dated Oct. 3, 2023, 10 pages with machine translation.

Chinese Office Action, issued in the corresponding Chinese patent application No. 202110951982.2, dated Dec. 30, 2021, 16 pages.

Zhang et al., "Learning Adaptive Segmentation Policy for Simultaneous Translation", Proceedings of the 2020 Conference on Empirical Methods in Natural Language Processing, Nov. 16-20, 2020, pp. 2280-2289.

eng Zhi-wei, "Phrase-based and syntax-based statistical machine translation", China Academic Journal Electronic Publishing House, Journal of Yanshan University, vol. 39, No. 6, Nov. 2015, 10 pages (English Abstract Included).

* cited by examiner

DISPLAY METHOD, METHOD OF TRAINING SEMANTIC UNIT DETECTION MODEL, ELECTRONIC DEVICE, AND STORAGE MEDIUM

CROSS REFERENCE TO RELATED APPLICATION(S)

This application claims priority to Chinese Patent Application No. 202110951982.2, filed on Aug. 18, 2021, the entire content of which is incorporated herein in its entirety by reference.

TECHNICAL FIELD

The present disclosure relates to a field of artificial intelligence technology, in particular to fields of natural language processing and machine translation technologies. More specifically, the present disclosure provides a display method, a method of training a semantic unit detection model, an electronic device, and a storage medium.

BACKGROUND

With a development of globalization and frequent international exchanges, a demand for a machine simultaneous interpretation is increasing, and there is a broad space for a development of the machine simultaneous interpretation. A presentation form of the machine simultaneous interpretation is to display simultaneous interpretation subtitles on a screen.

SUMMARY

The present disclosure provides a display method, a method of training a semantic unit detection model, an electronic device, and a storage medium.

According to an aspect, a display method is provided, including: acquiring a language sequence to be displayed; dividing the language sequence to be displayed into a plurality of semantic units with semantics; and converting the plurality of semantic units into subtitles for display one by one.

According to an aspect, a method of training a semantic unit detection model is provided, including: acquiring a sample language sequence containing a plurality of elements, wherein each element of the plurality of elements has an original label indicating whether an element unit composed of that element and at least one element preceding that element is a semantic unit with semantics; and training the semantic unit detection model using the sample language sequence and the original label for each element in the sample language sequence.

According to an aspect, an electronic device is provided, including: at least one processor, and a memory communicatively connected to the at least one processor, wherein the memory stores instructions executable by the at least one processor, and the instructions, when executed by the at least one processor, are configured to cause the at least one processor to implement the method provided in the present disclosure.

According to an aspect of the present disclosure, a non-transitory computer-readable storage medium having computer instructions therein is provided, wherein the computer instructions are configured to cause a computer system to implement the method provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

With a development of globalization and frequent international exchanges, a demand for a machine simultaneous interpretation is increasing, and there is a broad space for a development of the machine simultaneous interpretation. The machine simultaneous interpretation refers to automatically recognizing a speech content of a speaker, converting the speech content into a text and translating the speech content into a target language using speech recognition and machine translation technologies. A value of the machine simultaneous interpretation product is mainly reflected in solving problems of a cross-language communication and a cross-language information acquisition. An application scenario of the machine simultaneous interpretation mainly includes an international conference, and a mainstream presentation form in the industry is to display simultaneous interpretation subtitles on a screen.

At present, bilingual subtitles of the machine simultaneous interpretation are displayed on the screen in real time in a form of increment according to a granularity of "word" or "phrase", and the subtitles are updated in real time, especially the latest few words have a high probability to change. Every time the speaker speaks one word, a current speech recognition result may be translated in real time, and a translation result may not remain unchanged until an end of a sentence, which may lead to a poor translation in an intermediate state and a variable and unstable translation result.

Therefore, existing machine simultaneous interpretation solutions have at least the following problems. Displaying the simultaneous interpretation subtitles on the screen according to the granularity of "word" or "phrase" does not conform to a user's reading habits. The subtitles change in real time, flicker, and have a poor stability, which may result in a poor reading experience. The translation result is unstable, and the translation result on the screen may change in real time with an incremental input of an original text, which may increase the user's reading burden.

Embodiments of the present disclosure propose a display method, including dividing a language sequence to be displayed into a plurality of semantic units with semantics, and converting the plurality of semantic units into subtitles for display one by one, which may ensure a stability of a subtitle display effect and improve the user's reading experience.

Figure 1:
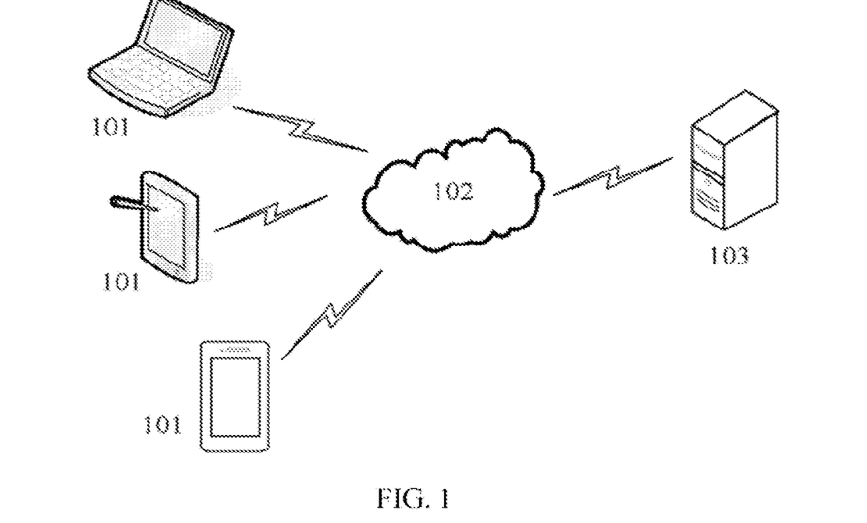
FIG. 1 shows a schematic diagram of an exemplary system architecture in which a display method and/or a method of training a semantic unit detection model may be applied according to an embodiment of the present disclosure.

In the technical solution of the present disclosure, the collection, storage, use, processing, transmission, provision, disclosure and application of the information involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained FIG. 1 shows a schematic diagram of an exemplary system architecture in which a display method and/or a method of training a semantic unit detection model may be applied according to an embodiment of the present disclosure. It should be noted that FIG. 1 is only an example of the system architecture in which embodiments of the present disclosure may be applied to help those skilled in the art understand the technical content of the present disclosure, but it does not mean that embodiments of the present disclosure may not be used in other devices, systems, environments or scenarios.

As shown in FIG. 1, a system architecture 100 according to this embodiment may include a plurality of terminal devices 101, a network 102, and a server 103. The network 102 is used to provide a medium for a communication link between the terminal devices 101 and the server 103. The network 102 may include various connection types, such as wired and/or wireless communication links, etc.

The terminal devices 101 used by a user may interact with the server 103 via the network 102 so as to receive or send messages, etc. The terminal devices 101 may be various electronic devices, including but not limited to smartphones, tablet computers, laptop computers, etc.

At least one of the display method and the method of training the semantic unit detection model provided by embodiments of the present disclosure may generally be performed by the server 103. Accordingly, the display apparatus and the apparatus of training the semantic unit detection model provided by embodiments of the present disclosure may generally be provided in the server 103. The display method and the method of training the semantic unit detection model provided by embodiments of the present disclosure may also be performed by a server or server cluster different from the server 103 and capable of communicating with the terminal devices 101 and/or the server 103. Accordingly, the display apparatus and the apparatus of training the semantic unit detection model provided by embodiments of the present disclosure may also be provided in a server or server cluster different from the server 103 and capable of communicating with the terminal devices 101 and/or the server 103.

Figure 2A:
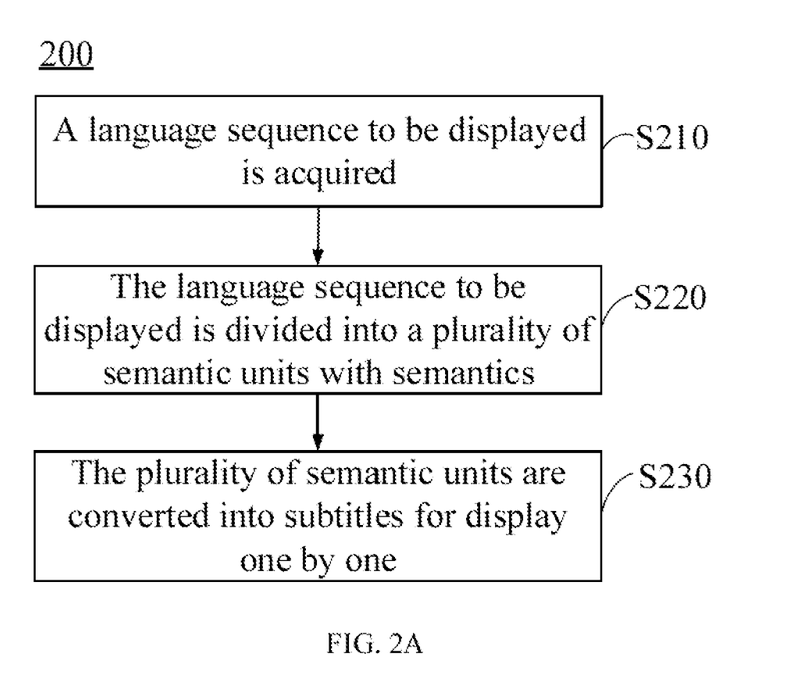
FIG. 2A to FIG. 2B show flowcharts of a display method according to an embodiment of the present disclosure.

FIG. 2A shows a flowchart of a display method according to an embodiment of the present disclosure.

As shown in FIG. 2A, a display method 200 may include operation S210 to operation S230.

In operation S210, a language sequence to be displayed is acquired.

For example, the language sequence to be displayed may be: a real-time speech stream generated based on a user's speech, or a text sequence obtained by performing a speech recognition on the speech stream. The language sequence to be displayed may be acquired from a public dataset, or the acquisition of the language sequence to be displayed is authorized by the user.

In operation S220, the language sequence to be displayed is divided into a plurality of semantic units with semantics.

For example, the language sequence to be displayed may be divided according to semantics, so as to obtain the plurality of semantic units with semantics.

When the language sequence to be displayed is a speech stream, each semantic unit contains at least one speech segment that has a correct semantic meaning. When the language sequence to be displayed is a text sequence, each semantic unit contains at least one word or phrase that has a correct semantic meaning.

For example, if the language sequence to be displayed is a text sequence of "大家好，今天我为大家服务", the language sequence to be displayed may be divided into a plurality of semantic units including [大家好], [今天], [我], . . . (a corresponding translation result is: Hello everyone. Today I . . . ), and the content in each semantic unit includes a word, a phrase or a sentence that has a correct semantic meaning.

If the language sequence to be displayed is divided into a plurality of semantic units including [大家], [好今天我] . . . (a corresponding translation result is: Everybody. Ok, today I . . . ), the semantic unit [好今天我] does not have a correct semantic meaning.

In operation S230, the plurality of semantic units are converted into subtitles for display one by one.

For example, when the language sequence to be displayed is a speech stream, a speech segment in each semantic unit of the language sequence to be displayed is converted into a text which is used as a subtitle for that semantic unit, and the subtitles for the plurality of semantic units are displayed one by one. When the language sequence to be displayed is a text sequence, a word, phrase or sentence in each semantic unit of the language sequence to be displayed is used as a subtitle for that semantic unit, and the subtitles for the plurality of semantic units are displayed one by one.

In embodiments of the present disclosure, the subtitles corresponding to the plurality of semantic units are displayed one by one, that is, the subtitles are displayed with the semantic unit as granularity, then the real-time change and flicker of the subtitles may be avoided, and the stability of displaying the subtitles may be ensured.

Figure 2B:
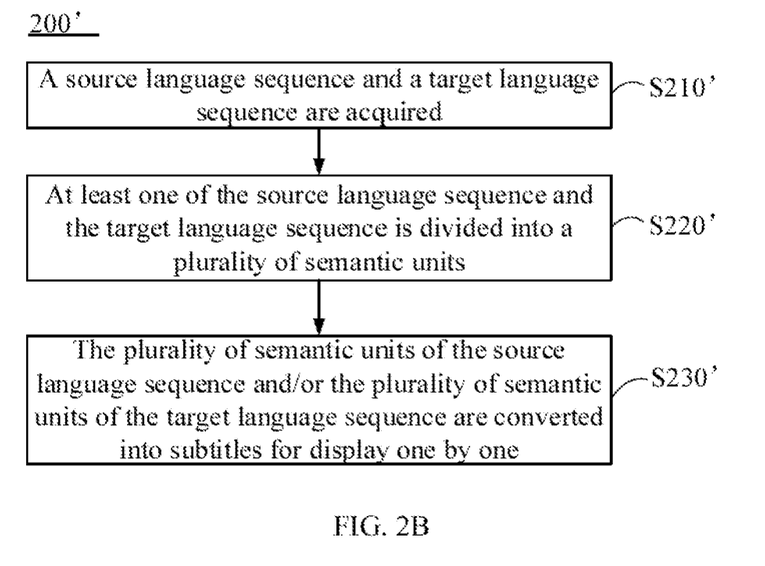

FIG. 2B shows a flowchart of a display method according to an embodiment of the present disclosure.

As shown in FIG. 2B, a display method 200' may include operation S210' to operation S230'.

In operation S210', a source language sequence and a target language sequence are acquired.

For example, in a simultaneous interpretation scenario, a speech stream of a speaker may be recognized as the source language sequence, and the source language sequence is translated into the target language sequence.

A language used by the speaker may be Chinese, English, etc., and the source language sequence may also be in Chinese, English, etc., and the target language sequence may be in English. Chinese, etc., correspondingly. For example, the speaker may speak in Chinese, then a source language sequence in Chinese may be generated, and the source language sequence in Chinese may be converted into a target language sequence in English by using a machine translation.

The source language sequence and the target language sequence may be speech streams. Alternatively, the source language sequence and the target language sequence may be text sequences. Alternatively, one of the source language sequence and the target language sequence is a speech stream, and the other of the source language sequence and the target language sequence is a text sequence, which is not limited in the present disclosure.

In operation S220', at least one of the source language sequence and the target language sequence is divided into a plurality of semantic units.

For example, the source language sequence may be divided into a plurality of semantic units according to semantics. For the target language sequence, divided semantic units of the target language sequence may be obtained by translating the plurality of semantic units of the source language sequence one by one. Alternatively, the source language sequence may be translated into the target language sequence as a whole, and then the target language sequence is divided into a plurality of semantic units with semantics according to semantics.

In operation S230', the plurality of semantic units of the source language sequence and/or the plurality of semantic units of the target language sequence are converted into subtitles for display one by one.

For the source language sequence, the semantic units of the source language sequence may be converted into subtitles, and the subtitles may be displayed one by one with the semantic unit as granularity. For example, if the plurality of semantic units of the source language sequence include [大家好], [今天], [我] . . . , then [大家好], [今天], [我] . . . may be displayed in sequence on a simultaneous interpretation screen.

For the target language sequence, the semantic units of the target language sequence may be converted into subtitles, and the subtitles may be displayed one by one with the semantic unit as granularity. For example, if the plurality of semantic units of the target language sequence include [hello everyone.], [Today], [I] . . . , then [hello everyone.], [Today], [I] . . . may be displayed in sequence on the simultaneous interpretation screen.

It may be understood that displaying stable semantic segments is more in line with users' reading habits. However, embodiments of the present disclosure are not limited to this. For example, at least one of the source language sequence and the target language sequence may also be displayed in real time with "word" or "phrase" as granularity. For example, the source language sequence may be displayed in real time with "word" or "phrase" as granularity, and the target language sequence may be displayed with the semantic unit as granularity.

In embodiments of the present disclosure, displaying at least one of the source language sequence and the target language sequence with the semantic unit as granularity may improve the stability of the subtitle display.

Figure 3A:
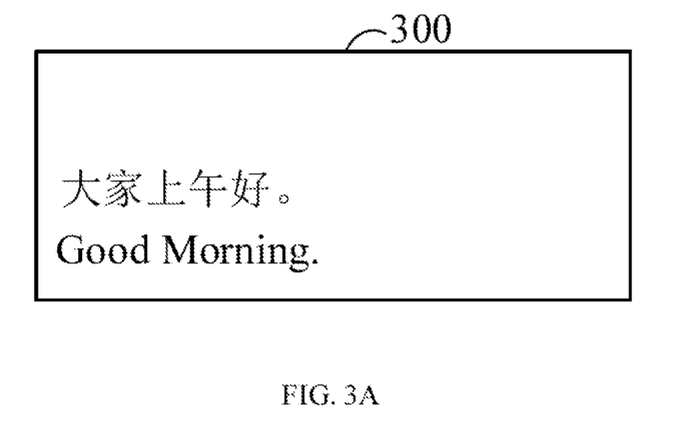
FIG. 3A to FIG. 3C show schematic diagrams of a display method according to an embodiment of the present disclosure.
Figure 3B:
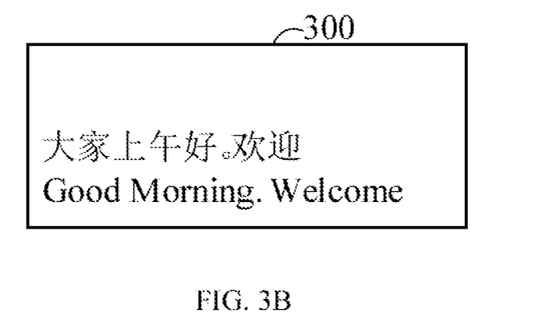
Figure 3C:
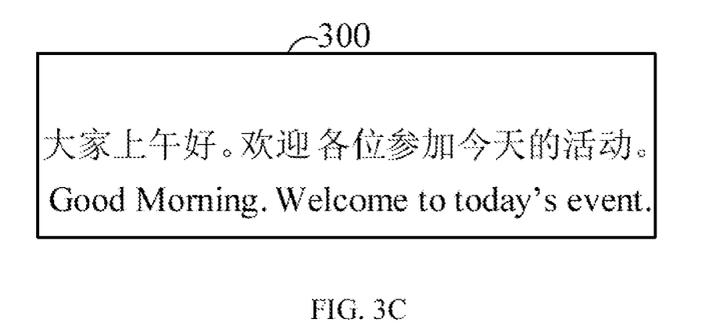

FIG. 3A to FIG. 3C show schematic diagrams of a display method according to an embodiment of the present disclosure.

In embodiments of the present disclosure, the source language sequence is "大家上午好。欢迎各位参加今天的活动", and a corresponding target language sequence is "Good Morning. Welcome to today's event." The source language sequence is divided into a plurality of semantic units with semantics, including [大家上午好。], [欢迎], [各位参加今天 的活动]. The target language sequence is divided into a plurality of semantic units with semantics, including [Good Morning.], [Welcome], [to today's event.].

For a case that both the semantic units of the source language sequence and the semantic units of the target language sequence are displayed on the screen one by one with the semantic unit as granularity, FIG. 3A to FIG. 3B show three successive frames on a screen 300, respectively.

As shown in FIG. 3A, in a first frame, the semantic unit [大家上午好。] in the source language sequence is displayed on the screen 300, and the semantic unit [Good Morning.] in the target language sequence is displayed on the screen 300.

As shown in FIG. 3B, in a second frame, the semantic units [大家上午好。] and [欢迎] in the source language sequence are displayed on the screen 300, and the semantic units [Good Morning.] and [Welcome] in the target language sequence are displayed on the screen 300.

As shown in FIG. 3C, in a third frame, the semantic units [大家上午好。], [欢迎] and [各位参加今天的活动] in the source language sequence are displayed on the screen 300, and the semantic units [Good Morning.], [Welcome] and [to today's event.] in the target language sequence are displayed on the screen 300.

In embodiments of the present disclosure, by displaying on the screen with the semantic unit as granularity, the translation content that has been displayed on the screen may not be changed and updated, and the stability of the translation result that has been displayed on the screen may be ensured.

According to embodiments of the present disclosure, the semantic unit with semantics may be further understood as "an unambiguous semantic unit". The unambiguous semantic unit may be understood as that, when the language sequence is divided into a plurality of unambiguous semantic units, a translation result for an unambiguous semantic unit among the plurality of unambiguous semantic units and a translation result for an another unambiguous semantic unit, among the plurality of unambiguous semantic units, subsequent to the unambiguous semantic unit are independent of each other, that is, the translation result for the unambiguous semantic unit may not change with the translation result for the another unambiguous semantic unit which is subsequent to the unambiguous semantic unit (the another unambiguous semantic unit may be referred to as a subsequent unambiguous semantic unit of the unambiguous semantic unit). In this way, when displaying with the unambiguous semantic unit as granularity, the translation content that has been displayed on the screen may not be changed and updated, and the stability of the translation result that has been displayed on the screen may be ensured.

Further, the unambiguous semantic unit refers to a smallest segment with which a translation result for an unambiguous semantic unit may not change with a translation result for a subsequent unambiguous semantic unit of the unambiguous semantic unit, so as to ensure a small delay of system.

Figure 4:
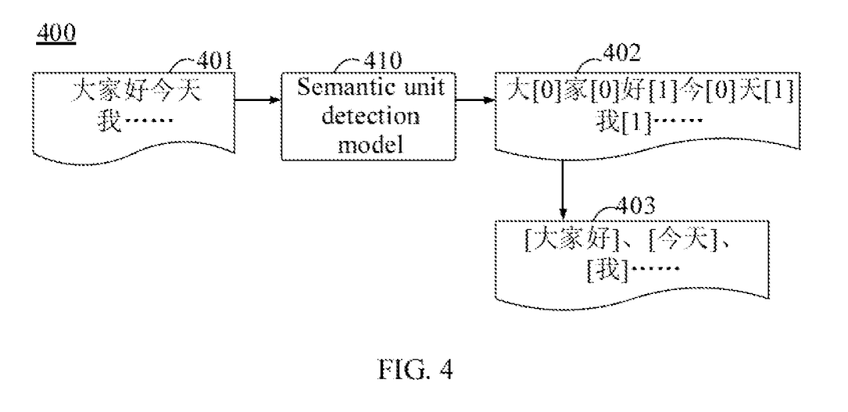
FIG. 4 shows a schematic diagram of a system for a method of dividing a language sequence into a plurality of semantic units with semantics according to an embodiment of the present disclosure.

FIG. 4 shows a schematic diagram of a system for a method of dividing a language sequence into a plurality of semantic units with semantics according to an embodiment of the present disclosure.

As shown in FIG. 4, a system 400 includes a semantic unit detection model 410. A language sequence 401 may be a text sequence. The semantic unit detection model 410 is used to classify each word in the language sequence 401 to obtain a label for each word. The label for each word may indicate whether a text unit composed of that word and at least one word preceding that word is a semantic unit with semantics. For example, if a label for a word in the language sequence 401 is 1, it indicates that a text unit composed of the word and at least one word preceding the word is a semantic unit with semantics. If the label is 0, it indicates that a text unit composed of the word and at least one word preceding the word is not a semantic unit with semantics.

For example, if the language sequence 401 of "大家好今天我..." is input into the semantic unit detection model 410, then a text sequence 402 with labels "大[0]家[0]好[1] 今[0]天[1]我[1]..." may be output. The label for "大" is 0, indicating that [大] is not a semantic unit with semantics, and the label for "家" is 0, indicating that [大家] is not a semantic unit with semantics. This is because that a translation result for [大家] may be affected and changed by a subsequent translation result. The label for "好" is 1, indicating that [大家好] is a semantic unit with semantics.

By dividing at a position where the label is 1 in the text sequence 402 with labels, a division result sequence 403 for the language sequence 401 may be obtained. The division result sequence 403 may contain a plurality of semantic units with semantics, including [大家好], [今天], [我]....

Embodiments of the present disclosure further provide a method of training a semantic unit detection model.

Figure 5:
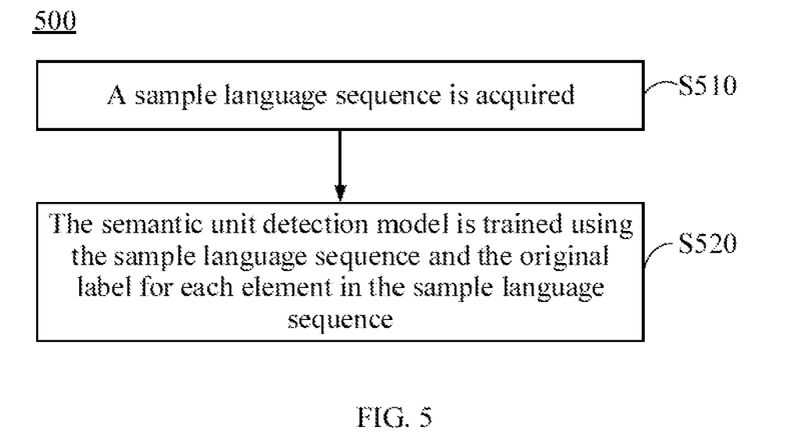
FIG. 5 shows a flowchart of a method of training a semantic unit detection model according to an embodiment of the present disclosure.

FIG. 5 shows a flowchart of a method of training a semantic unit detection model according to an embodiment of the present disclosure.

As shown in FIG. 5, a method 500 of training a semantic unit detection model includes operation S510 to operation S520.

In operation S510, a sample language sequence is acquired.

For example, the sample language sequence may be a speech stream or a text sequence. The sample language sequence may be acquired from a public dataset, or an acquisition of the sample language sequence is authorized by the user.

When the sample language sequence is a speech stream, a plurality of elements in the sample language sequence may be a plurality of speech segments, and each speech segment may have an original label that indicates whether a speech unit composed of that speech segment and at least one speech segment preceding that speech segment is a semantic unit with semantics.

When the sample language sequence is a text sequence, a plurality of elements in the sample language sequence may be a plurality of words or phrases, and each word or phrase may have an original label that indicates whether a text unit composed of that word or phrase and at least one word or phrase preceding that word or phrase is a semantic unit with semantics.

For example, the sample language sequence may be a text sequence "上午 10 点我去了趟公园", "上午" is a first word, with an original label of 0, which indicates that the text unit [上午] composed of the first word is not a semantic unit with semantics. "10" is a second word, with an original label of 0, which indicates that the text unit [上午 10] composed of the first two words is not a semantic unit with semantics. "点" is a third word, with an original label of 1, which indicates that the text unit [上午 10 点] composed of the first three words is a semantic unit with semantics.

In operation S520, the semantic unit detection model is trained using the sample language sequence and the original label fir each element in the sample language sequence.

For example, the above-mentioned sample language sequence "上午 10 点我 去了趟公园" and the label for each word in the above-mentioned sample language sequence may be used as training data to train an initial semantic unit detection model (such as a binary classification model), so as to obtain a trained semantic unit detection model.

For example, the sample language sequence may be input into the initial semantic unit detection model to output a prediction label for each word in the sample language sequence. Based on a difference between the original label for the sample language sequence in the training data and the prediction label output by the model, a loss (such as a cross entropy loss) may be calculated. The initial semantic unit detection model may be adjusted according to the loss to obtain an updated semantic unit detection model. Based on the updated semantic unit detection model, a next sample language sequence is input into the updated semantic unit detection model, that is, the above-mentioned training process is repeatedly performed, until the loss between the original label for the sample language sequence and the prediction label output by the model meets a preset condition (such as the loss is a converged). Then the training is stopped, and the trained semantic unit detection model may be obtained.

A language sequence to be divided may be input into the trained semantic unit detection model, and a label for each word in the language sequence may be obtained.

In embodiments of the present disclosure, by training the semantic unit detection model using the sample language sequence and the label for each word or phrase in the sample language sequence, the language sequence may be divided into a plurality of semantic units with semantics based on the trained semantic unit detection model.

Figure 6:
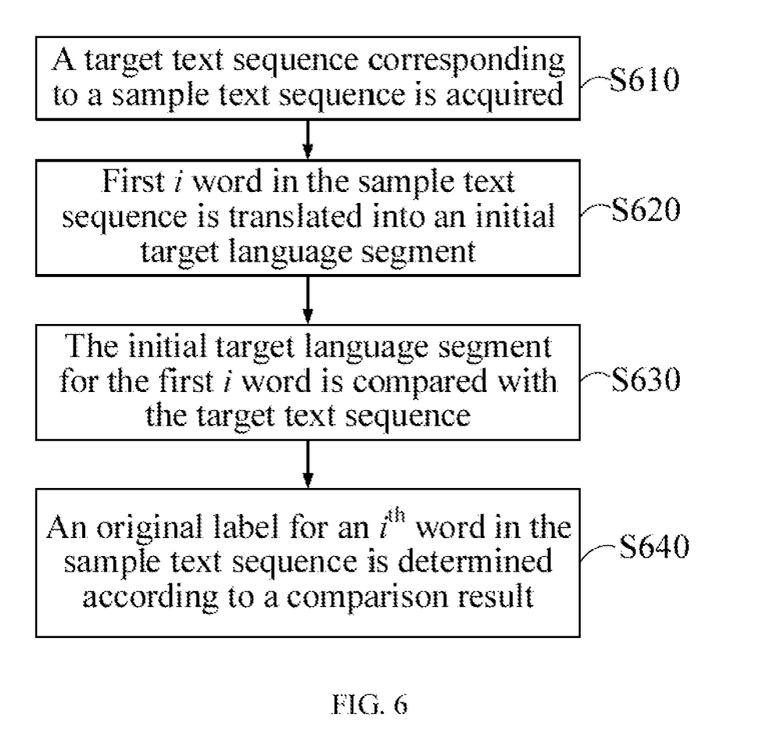
FIG. 6 shows a flowchart of a method of determining an original label for each word in a sample text sequence according to an embodiment of the present disclosure.

FIG. 6 shows a flowchart of a method of determining an original label for each word in a sample text sequence according to an embodiment of the present disclosure.

As shown in FIG. 6, the method includes operation S610 to operation S640.

In operation S610, a target text sequence corresponding to a sample text sequence is acquired.

For example, the sample language sequence may be a sample text sequence, and the target text sequence corresponding to the sample text sequence may be a text obtained by translating the sample text sequence into a target language. In an embodiment, the sample text sequence may be in Chinese and the target text sequence may be in English. For example, the sample text sequence may be "

上午 10 点我去了趟公园", and the target text sequence may be "At 10 am, I went to the park".

In operation S620, first i word in the sample text sequence is translated into an initial target language segment.

For example, a length of the sample text sequence may be a number of words or phrases contained in the text. In the sample text sequence "上午 10 点我去了趟公园", "上午" is a first word, "10" is a second word, "点" is a third word, . . . , "公园" is a seventh word. Therefore, the length of the sample text sequence may be 7.

The first i word in the sample text sequence may be translated into the initial target language segment. For example, the first word "上午" is translated into "Morning", the first two words "上午" and "10" are translated into "Morning 10", the first three words "上午", "10" and "点" are translated into "At 10 am", . . . and the first seven words are translated into "At 10 am, I went to the park". A translation result for the first seven words is a translation result for a whole sentence of the sample text sequence, i.e., the sample target text sequence.

In operation S630, the initial target language segment for the first i word in the sample text sequence is compared with the target text sequence.

In operation S640, an original label for an i$^{th}$ word in the sample text sequence is determined according to a comparison result.

For example, the initial target language segment "Morning" for the first word may be compared with the target text sequence "At 10 am, I went to the park". The target language segment "At 10 am" in "At 10 am, I went to the park" corresponds to the first word, but "Morning" is different from "At 10 am", that is, "Morning" does not match "At 10 am, I went to the park". Therefore, the original label for the first word in the sample text sequence may be set to 0, which indicates that the text unit [上午] composed of the first word is not a semantic unit with semantics.

For example, the initial target language segment "Morning 10" for the first two words may be compare with the target text sequence "At 10 am, I went to the park". The target language segment "At 10 am" in "At 10 am, I went to the park" corresponds to the first two words, but "Morning 10" is different from "At 10 am". Therefore, the original label for the second word "10" is set to 0, which indicates that the text unit [上午 10] composed of the first two words is not a semantic unit with semantics.

For example, the initial target language segment "At 10 am" for the first three words may be compared with the target text sequence "At 10 am, I went to the park". The target language segment "At 10 am" in "At 10 am, I went to the park" corresponds to the first three words, and the initial target language segment "At 10 am" is the same as the target language segment "At 10 am". Therefore, the original label for the third word "点" is set to 1, which indicates that the first three words "上午 10 点" form a semantic unit with semantics.

Similarly, the original label for the fourth word to the original label for the seventh word may be obtained.

It may be understood that, if the initial target language segment for the first i word is the same as the target language segment, in the target text sequence, corresponding to the first i word, then the original label for the i$^{th}$ word is set to 1. If the initial target language segment for the first i word is different from the target language segment, in the target text sequence, corresponding to the first i word, then the original label for the i$^{th}$ word is set to 0.

Taking the sample text sequence "上午 10 点我去了趟公园" as an example, results of comparing the initial target language segment for the first word to the initial target language segment for the first seven words with the target text sequence are shown in Table 1 below.

TABLE 1

| Sample text sequence | 上午 10 点 我 去 了 趟 公园 | |
|---|---|---|
| Target text sequence | At 10 am, I went to the park. | |
| First word | Morning | 0 |
| First two words | Morning 10 | 0 |
| First three words | At 10 am | 1 |
| First four words | At 10 am, I | 1 |
| First five words | At 10 am, I went there | 0 |
| First six words | At 10 am, I went to | 1 |
| First seven words | At 10 am, I went to the park. | 1 |
| Division result | 上午 10 点 ∣ 我 ∣ 去了趟 公园 | |

As shown in Table 1, "上午 10 点我去了趟公园" may be finally labeled as "上午[0]10[0]点[1] 我[1]去了[0]趟[1] 公园[1]". By dividing at a position where the label is 1, a plurality of semantic units with semantics may be obtained, including [上午 10 点], [我], [去了趟], [公园].

Figure 7:
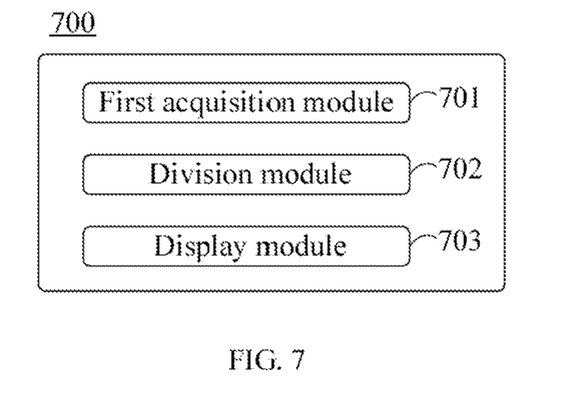
FIG. 7 shows a block diagram of a display apparatus according to an embodiment of the present disclosure.

FIG. 7 shows a block diagram of a display apparatus according to an embodiment of the present disclosure.

As shown in FIG. 7, a display apparatus 700 includes a first acquisition module 701, a division module 702, and a display module 703.

The first acquisition module 701 is used to acquire a language sequence to be displayed.

The division module 702 is used to divide the language sequence to be displayed into a plurality of semantic units with semantics.

The display module 703 is used to convert the plurality of semantic units into subtitles for display one by one.

According to embodiments of the present disclosure, the language sequence to be displayed includes a source language sequence and a target language sequence, and the target language sequence is obtained by translating the source language sequence.

The division module 702 is used to divide at least one of the source language sequence and the target language sequence into a plurality of semantic units The display module 703 is used to convert the plurality of semantic units of the source language sequence and/or the plurality of semantic units of the target language sequence into subtitles for display one by one.

According to embodiments of the present disclosure, a translation result for a semantic unit among the plurality of semantic units with semantics and a translation result for an another semantic unit among the plurality of semantic units with semantics are independent of each other, and wherein the another semantic unit is subsequent to the semantic unit.

According to embodiments of the present disclosure, the division module 702 is used to divide the language sequence to be displayed into a plurality of semantic units with semantics using a semantic unit detection model.

According to embodiments of the present disclosure, the language sequence to be displayed is a text sequence to be displayed, and the division module 702 includes a first input unit, a determination unit and a division unit.

The first input unit is used to input the text sequence to be displayed into the semantic unit detection model to obtain a label for each word in the text sequence to be displayed. The label for each word indicates whether a text unit composed of that word and at least one word preceding that word is a semantic unit with semantics.

The determination unit is used to determine a target word with a target label in the text sequence to be displayed, and the target label indicates that a text unit composed of the target word with the target label and at least one word preceding the target word is a semantic unit with semantics.

The division unit is used to divide at a position of each target word in the text sequence to be displayed, so as to obtain a plurality of text units as the plurality of semantic units with semantics.

Figure 8:
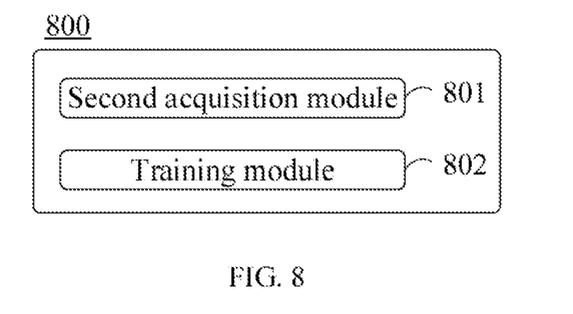
FIG. 8 shows a block diagram of an apparatus of training a semantic unit detection model according to an embodiment of the present disclosure.

FIG. 8 shows a block diagram of an apparatus of training a semantic unit detection model according to an embodiment of the present disclosure.

As shown in FIG. 8, an apparatus 800 of training a semantic unit detection model includes a second acquisition module 801 and a training module 802.

The second acquisition module 801 is used to acquire a sample language sequence containing a plurality of elements, and each element of the plurality of elements has an original label that indicates whether an element unit composed of that element and at least one element preceding that element is a semantic unit with semantics.

The training module 802 is used to train the semantic unit detection model using the sample language sequence and the original label for each element in the sample language sequence.

According to embodiments of the present disclosure, the sample language sequence may be a sample text sequence, each element in the sample language sequence is each word in the sample text sequence, and a length of the sample text sequence is L, where L is an integer greater than or equal to 1.

The apparatus 800 of training the semantic unit detection model further includes a third acquisition module, a translation module, a comparison module and a determination module.

The third acquisition module is used to acquire a target text sequence corresponding to the sample text sequence, which is obtained by translating the sample text sequence.

The translation module is used to translate first i word in the sample text sequence into an initial target language segment, where i is an integer greater than or equal to 1 and less than or equal to L.

The comparison module is used to compare the initial target language segment for the first i word with the target text sequence.

The determination module is used to determine an original label for an $i^{th}$ word in the sample text sequence according to a comparison result.

According to embodiments of the present disclosure, the comparison module may include a first comparison unit and a second comparison unit.

The first comparison unit is used to determine the original label for the $i^{th}$ word as a positive sample to indicate that the text unit composed of the first i word in the sample text sequence is a semantic unit with semantics, in response to the initial target language segment for the first i word being the same as the target language segment, in the target text sequence, corresponding to the first i word.

The second comparison unit is used to determine the original label for the $i^{th}$ word as a negative sample to indicate that the text unit composed of the first i word in the sample text sequence is not a semantic unit with semantics, in response to the initial target language segment for the first i word being different from the target language segment, in the target text sequence, corresponding to the first i word.

According to embodiments of the present disclosure, the sample language sequence may be a sample text sequence, and each element in the sample language sequence is each word in the sample text sequence. The training module 802 may include a second input unit and an adjustment unit.

The second input unit is used to input the sample text sequence into the semantic unit detection model to obtain a prediction label for each word in the sample text sequence.

The adjustment unit is used to adjust a parameter of the semantic unit detection model according to a difference between the original label and the prediction label for each word in the sample text sequence, and in response to the difference not meeting a preset condition, input a next sample text sequence into the adjusted semantic unit detection model.

According to embodiments of the present disclosure, the present disclosure further provides an electronic device, a readable storage medium, and a computer program product.

Figure 9:
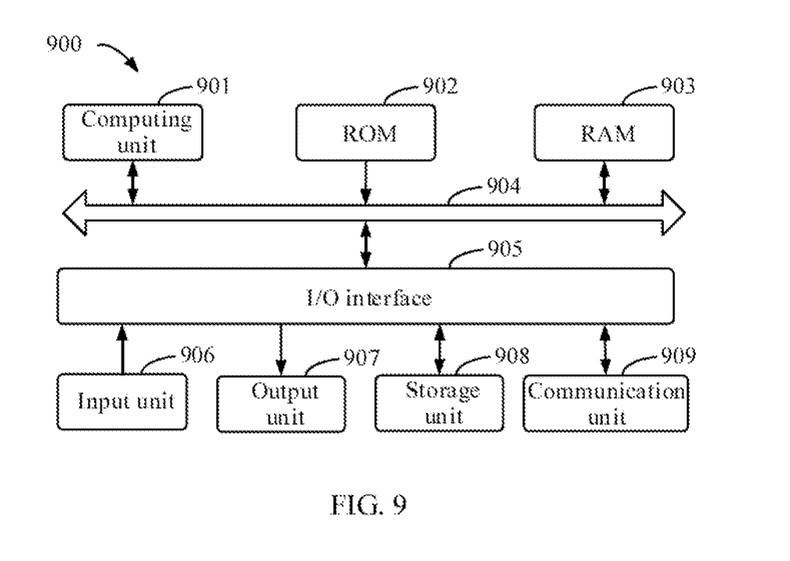
FIG. 9 shows a block diagram of an electronic device for implementing a display method and/or a method of training a semantic unit detection model according to an embodiment of the present disclosure.

FIG. 9 shows a schematic block diagram of an exemplary electronic device 900 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or dedicated processing assemblies having processing and computing capabilities. Some examples of the computing units 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and processes described above, such as the display method and the method of training the semantic unit detection model. For example, in some embodiments, the display method and the method of training the semantic unit detection model may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the display method and the method of training the semantic unit detection model. Alternatively, in other embodiments, the computing unit 901 may be configured to perform the display method and the method of training the semantic unit detection model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server or a server of distributed system or a server combined with block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a semantic unit detection model, comprising:
  acquiring a sample language sequence containing a plurality of elements, wherein each element of the plurality of elements has an original label indicating whether an element unit composed of that element and at least one element preceding that element is a semantic unit with semantics; and
  training the semantic unit detection model using the sample language sequence and the original label for each element in the sample language sequence;
  wherein the sample language sequence is a sample text sequence, each element in the sample language sequence is each word in the sample text sequence, and a length of the sample text sequence is L, wherein L is an integer greater than or equal to 1, the method further comprising:
  acquiring a target text sequence corresponding to the sample text sequence, wherein the target text sequence is obtained by translating the sample text sequence;

translating first i word in the sample text sequence into an initial target language segment, wherein i is an integer greater than or equal to 1 and less than or equal to L;

comparing the initial target language segment for the first i word in the sample text sequence with the target text sequence; and determining an original label for an $i^{th}$ word in the sample text sequence according to a comparison result;

wherein the determining an original label for an $i^{th}$ word in the sample text sequence according to a comparison result comprises:

determining the original label for the $i^{th}$ word in the sample text sequence as a positive sample to indicate that a text unit composed of the first i word in the sample text sequence is a semantic unit with semantics, in response to the initial target language segment for the first i word in the sample text sequence being the same as a target language segment, in the target text sequence, corresponding to the first i word; and determining the original label for the $i^{th}$ word in the sample text sequence as a negative sample to indicate that a text unit composed of the first i word in the sample text sequence is not a semantic unit with semantics, in response to the initial target language segment for the first i word in the sample text sequence being different from the target language segment, in the target text sequence, corresponding to the first i word.

2. A display method, comprising:
acquiring a language sequence to be displayed;
dividing the language sequence to be displayed into a plurality of semantic units with semantics using a semantic unit detection model, wherein the semantic unit detection model is trained by using the method of claim 1; and
converting the plurality of semantic units into subtitles for display one by one.

3. The method of claim 2, wherein the language sequence to be displayed comprises a source language sequence and a target language sequence, and the target language sequence is obtained by translating the source language sequence, and
wherein the dividing the language sequence to be displayed into a plurality of semantic units with semantics comprises:
dividing at least one of the source language sequence and the target language sequence into a plurality of semantic units, and
wherein the converting the plurality of semantic units into subtitles for display one by one comprises:
converting the plurality of semantic units of the source language sequence and/or the plurality of semantic units of the target language sequence into subtitles for display one by one.

4. The method of claim 2, wherein a translation result for a semantic unit among the plurality of semantic units with semantics and a translation result for an another semantic unit among the plurality of semantic units with semantics are independent of each other, and wherein the another semantic unit is subsequent to the semantic unit.

5. The method of claim 2, wherein the language sequence to be displayed is a text sequence to be displayed,
the dividing the language sequence to be displayed into the plurality of semantic units with semantics using a semantic unit detection model comprises:
inputting the text sequence to be displayed into the semantic unit detection model to obtain a label for each word in the text sequence to be displayed,
wherein the label for each word indicates whether a text unit composed of that word and at least one word preceding that word is a semantic unit with semantics;
determining a target word with a target label in the text sequence to be displayed, wherein the target label indicates that a text unit composed of the target word with the target label and at least one word preceding the target word is a semantic unit with semantics; and
dividing the text sequence to be displayed at a position of each target word in the text sequence to be displayed, so as to obtain a plurality of text units as the plurality of semantic units with semantics.

6. The method of claim 3, wherein a translation result for a semantic unit among the plurality of semantic units with semantics and a translation result for an another semantic unit among the plurality of semantic units with semantics are independent of each other, and wherein the another semantic unit is subsequent to the semantic unit.

7. The method of claim 1, wherein
the training the semantic unit detection model using the sample language sequence and the original label for each element in the sample language sequence comprises:
inputting the sample text sequence into the semantic unit detection model to obtain a prediction label for each word in the sample text sequence; and
adjusting a parameter of the semantic unit detection model according to a difference between the original label for each word in the sample text sequence and the prediction label for that word in the sample text sequence, and in response to the difference not meeting a preset condition, inputting a next sample text sequence into the adjusted semantic unit detection model.

8. The method of claim 1, wherein the sample text sequence is divided into a plurality of semantic units with semantics based on the original label for each word in the sample text sequence, and a translation result for a semantic unit among the plurality of semantic units with semantics and a translation result for an another semantic unit among the plurality of semantic units with semantics are independent of each other, and wherein the another semantic unit is subsequent to the semantic unit.

9. An electronic device, comprising:
at least one processor; and
a memory communicatively connected to the at least one processor, wherein the memory stores instructions executable by the at least one processor, and the instructions, when executed by the at least one processor, are configured to cause the at least one processor to at least implement the method of claim 2.

10. The electronic device according to claim 9, wherein the language sequence to be displayed comprises a source language sequence and a target language sequence, and the target language sequence is obtained by translating the source language sequence,
the instructions are further configured to cause the at least one processor to at least: divide at least one of the source language sequence and the target language sequence into a plurality of semantic units, and
the instructions are further configured to cause the at least one processor to at least: convert the plurality of semantic units of the source language sequence and/or the plurality of semantic units of the target language sequence into subtitles for display one by one.

11. The electronic device according to claim 9, wherein a translation result for a semantic unit among the plurality of semantic units with semantics and a translation result for an another semantic unit among the plurality of semantic units with semantics are independent of each other, and wherein the another semantic unit is subsequent to the semantic unit.

12. The electronic device according to claim 10, wherein a translation result for a semantic unit among the plurality of semantic units with semantics and a translation result for an another semantic unit among the plurality of semantic units with semantics are independent of each other, and wherein the another semantic unit is subsequent to the semantic unit.

13. The electronic device according to claim 9, wherein the language sequence to be displayed is a text sequence to be displayed, and the instructions are further configured to cause the at least one processor to at least:

input the text sequence to be displayed into the semantic unit detection model to obtain a label for each word in the text sequence to be displayed, wherein the label for each word indicates whether a text unit composed of that word and at least one word preceding that word is a semantic unit with semantics;

determine a target word with a target label in the text sequence to be displayed, wherein the target label indicates that a text unit composed of the target word with the target label and at least one word preceding the target word is a semantic unit with semantics; and     divide the text sequence to be displayed at a position of each target word in the text sequence to be displayed, so as to obtain a plurality of text units as the plurality of semantic units with semantics.

14. A non-transitory computer-readable storage medium having computer instructions therein, wherein the computer instructions are configured to cause a computer system to implement the method of claim 2.

15. An electronic device, comprising:

at least one processor; and a memory communicatively connected to the at least one processor, wherein the memory stores instructions executable by the at least one processor, and the instructions, when executed by the at least one processor, are configured to cause the at least one processor to at least:

acquire a sample language sequence containing a plurality of elements, wherein each element of the plurality of elements has an original label indicating whether an element unit composed of that element and at least one element preceding that element is a semantic unit with semantics; and     train a semantic unit detection model using the sample language sequence and the original label for each element in the sample language sequence;

wherein the sample language sequence is a sample text sequence, each element in the sample language sequence is each word in the sample text sequence, and a length of the sample text sequence is L, wherein L is an integer greater than or equal to 1, and the instructions are further configured to cause the at least one processor to at least:

acquire a target text sequence corresponding to the sample text sequence, wherein the target text sequence is obtained by translating the sample text sequence;

translate first i word in the sample text sequence into an initial target language segment, wherein i is an integer greater than or equal to 1 and less than or equal to L;

compare the initial target language segment for the first i word in the sample text sequence with the target text sequence; and determine an original label for an $i^{th}$ word in the sample text sequence according to a comparison result;

wherein the instructions are further configured to cause the at least one processor to at least:

determine the original label for the $i^{th}$ word in the sample text sequence as a positive sample to indicate that a text unit composed of the first i word in the sample text sequence is a semantic unit with semantics, in response to the initial target language segment for the first i word in the sample text sequence being the same as a target language segment, in the target text sequence, corresponding to the first i word; and determine the original label for the $i^{th}$ word in the sample text sequence as a negative sample to indicate that a text unit composed of the first i word in the sample text sequence is not a semantic unit with semantics, in response to the initial target language segment for the first i word in the sample text sequence being different from the target language segment, in the target text sequence, corresponding to the first i word.

\* \* \* \* \*